United States Patent
Galvagno

(10) Patent No.: US 7,182,359 B2
(45) Date of Patent: Feb. 27, 2007

(54) MOTORCYCLE WITH ACCESSORY

(76) Inventor: Vincenzo Galvagno, Via Campagna, 14, Serocca d'Agno (CH) CH 6982

( * ) Notice: Subject to any disclaimer, the term of this patent is extended or adjusted under 35 U.S.C. 154(b) by 251 days.

(21) Appl. No.: 10/937,954

(22) Filed: Sep. 10, 2004

(65) Prior Publication Data

US 2005/0056671 A1    Mar. 17, 2005

(30) Foreign Application Priority Data

Sep. 16, 2003    (EP)    ............................ 03020926

(51) Int. Cl.
  *B62K 21/12*    (2006.01)
  *B62J 27/00*    (2006.01)

(52) U.S. Cl. ................. 280/288.4; 280/835; 180/219; 224/419; 74/551.3; 74/551.4

(58) Field of Classification Search ............... 180/219; 280/835, 288.4; 224/419; 74/551.3, 551.4
See application file for complete search history.

(56) References Cited

U.S. PATENT DOCUMENTS

| 5,002,149 | A | 3/1991 | Watanabe et al. |
| 6,868,584 | B2* | 3/2005 | Trottier ........................ 16/421 |
| 6,896,279 | B2* | 5/2005 | Galvagno ................. 280/304.5 |
| 2006/0118585 | A1* | 6/2006 | Ognissanti et al. ......... 224/413 |

FOREIGN PATENT DOCUMENTS

| DE | 86 16 509 U1 | 8/1986 |
| JP | 01197189 A * | 8/1989 |
| JP | 02114077 A1 | 4/1990 |
| JP | 03067794 A * | 3/1991 |

* cited by examiner

*Primary Examiner*—Lesley D. Morris
*Assistant Examiner*—Marc A. Scharich
(74) *Attorney, Agent, or Firm*—Akerman Senterfitt

(57) ABSTRACT

Motorcycle of the type comprising a fuel tank (15), an opening (16) situated on the tank (15) for filling up with fuel, a bulkhead flange (17) at the opening (16) for receiving a cap (18) for closing the tank and an accessory (40) associated with the tank by a bayonet joint (44).

10 Claims, 4 Drawing Sheets

MOTORCYCLE WITH ACCESSORY

FIELD OF APPLICATION

The present invention refers to a motorcycle of the type comprising a fuel tank, an opening situated on said tank for filling up with fuel, a bulkhead flange at said opening for receiving a cap for closing the tank and an accessory associated with said tank.

PRIOR ART

Relative to the use of motorcycles, it is well known the requirement of equipping them with appropriate accessories generally associated with the tank of such motorcycles.

For example, in order to also provide the possible passenger transported on them with some valid means suitable for preventing, or at least hindering, an accidental unseating, appropriate accessories have been proposed in the form of pegs consisting of tubular L-shaped grips, fixed to the tank of the motorcycle through welding.

Although they are advantageous from some points of view, the tubular grips described above suffer from a recognized serious drawback. Indeed, they are difficult to install, requiring complicated tools and laborious assembly operations.

SUMMARY OF THE INVENTION

The technical problem forming the basis of the present invention is that of providing a motorcycle of the aforementioned type having structural and functional characteristics such as to overcome the drawbacks of the prior art described above.

The aforementioned technical problem is solved, according to the present invention, by a motorcycle of the type specified characterized in that it comprises a bayonet joint between said accessory and said bulkhead flange, for the rapid fixing of the accessory to the tank.

Further characteristics and the advantages of the finding shall become clearer from the detailed description of an embodiment of a motorcycle according to the finding, given hereafter with reference to the attached drawings, for indicating and not limiting purposes.

DETAILED DESCRIPTION OF THE INVENTION

Figure 1:
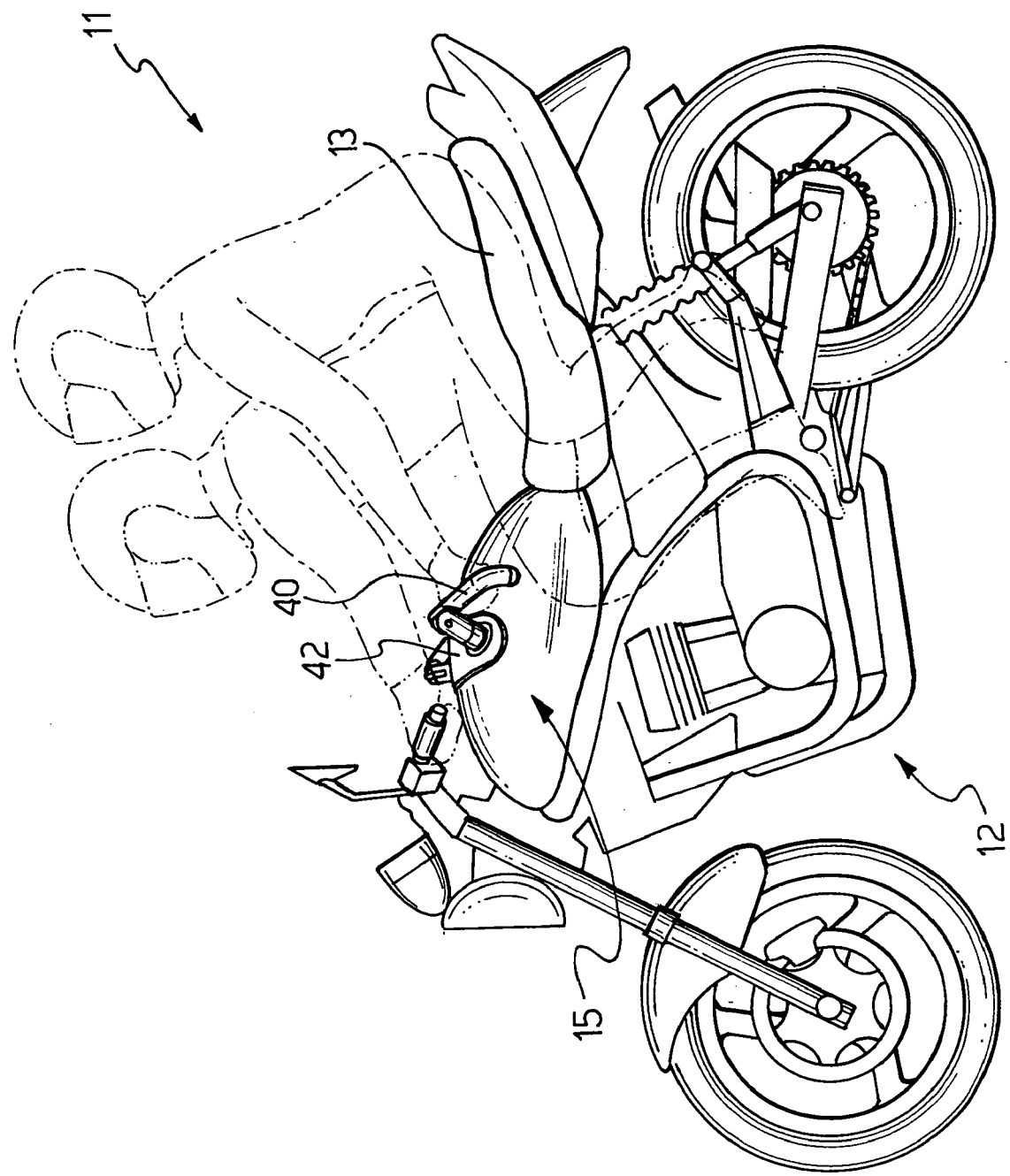
FIG. 1 shows a side view of a motorcycle according to the present invention.
Figure 1A:
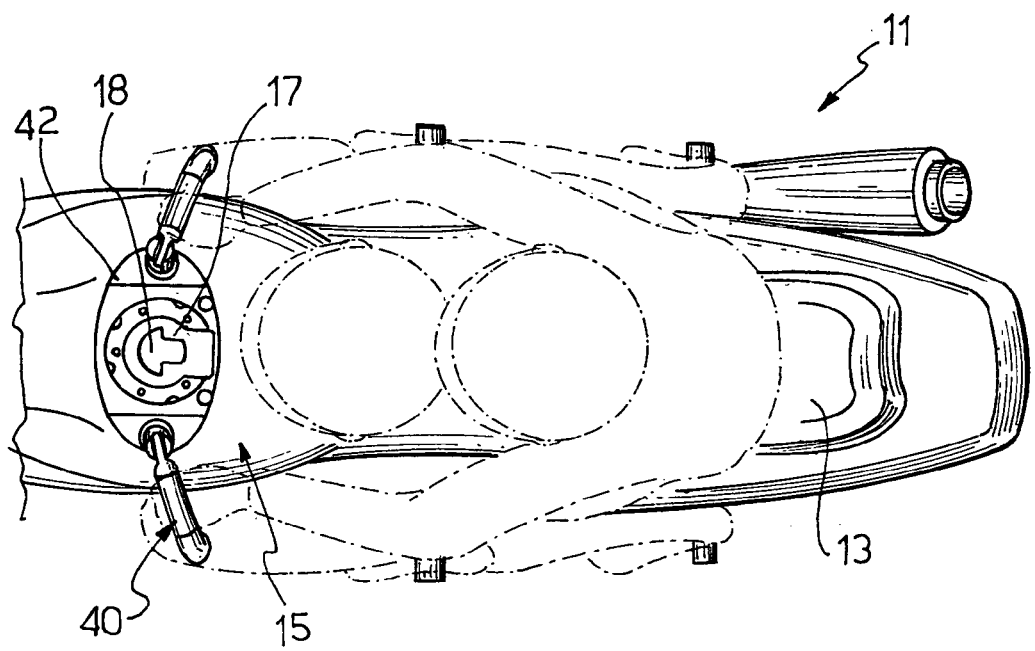
FIG. 1A shows a plan view from above of the motorcycle of FIG. 1.
Figure 5:
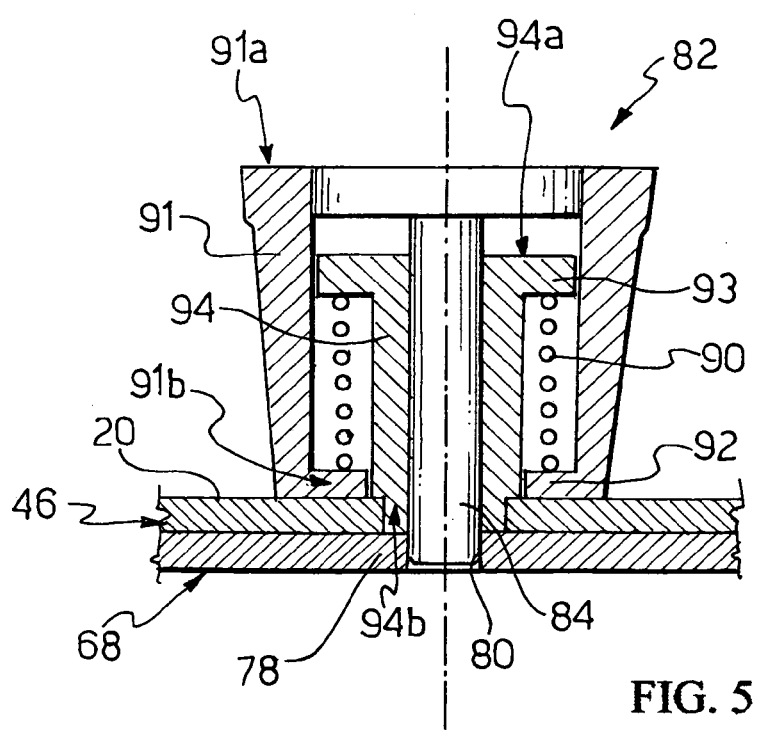
FIG. 5 shows an enlarged section view of a particular of the detail of the motorcycle of FIG. 2.
Figure 2:
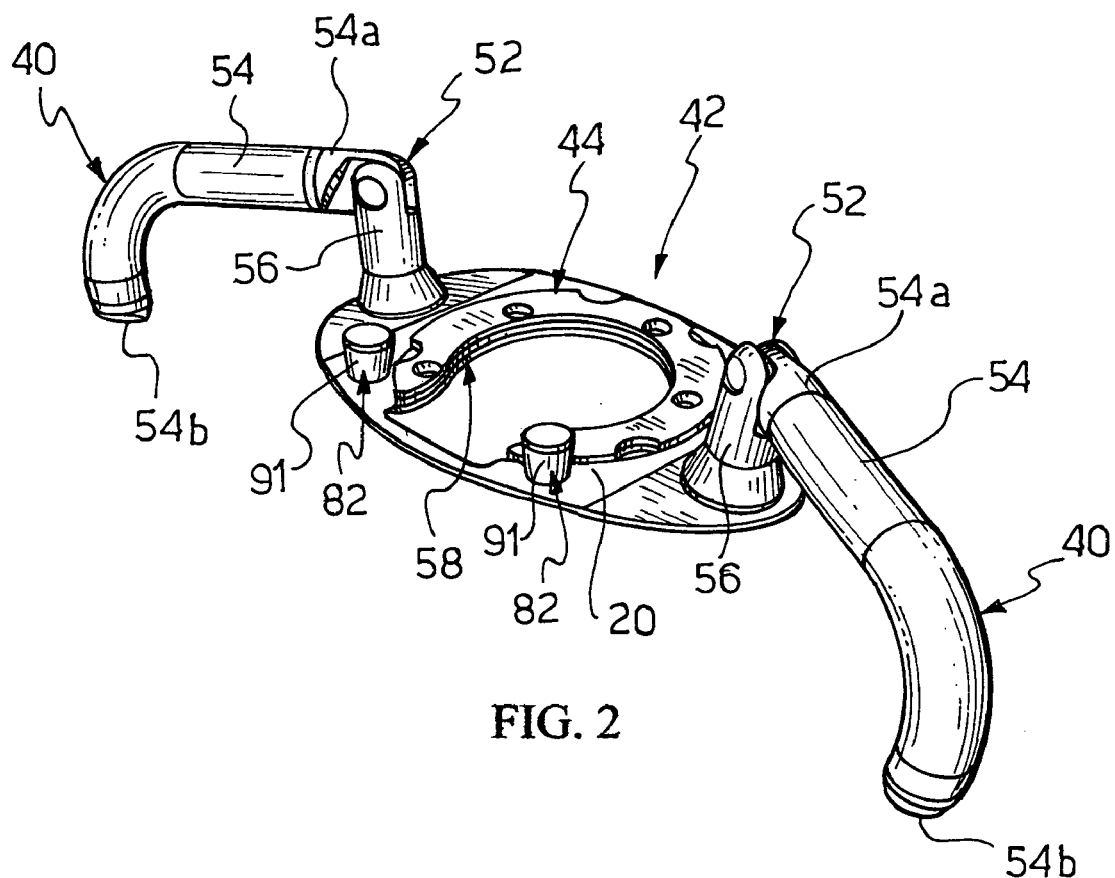
FIG. 2 shows an enlarged perspective view of a detail of the motorcycle of FIG. 1.
Figure 3:
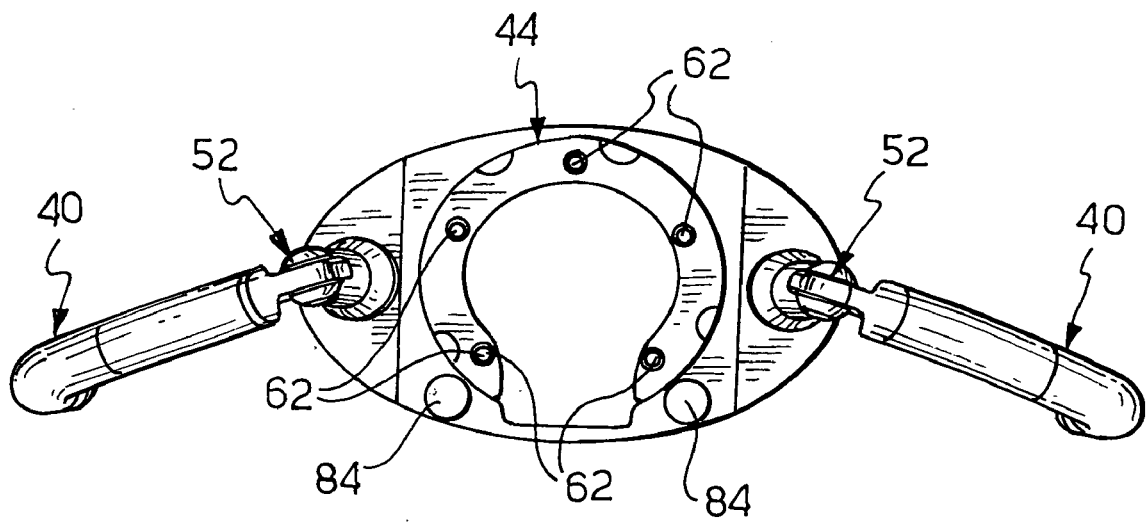
FIG. 3 shows a plan view from above of the detail of FIG. 2.
Figure 4:
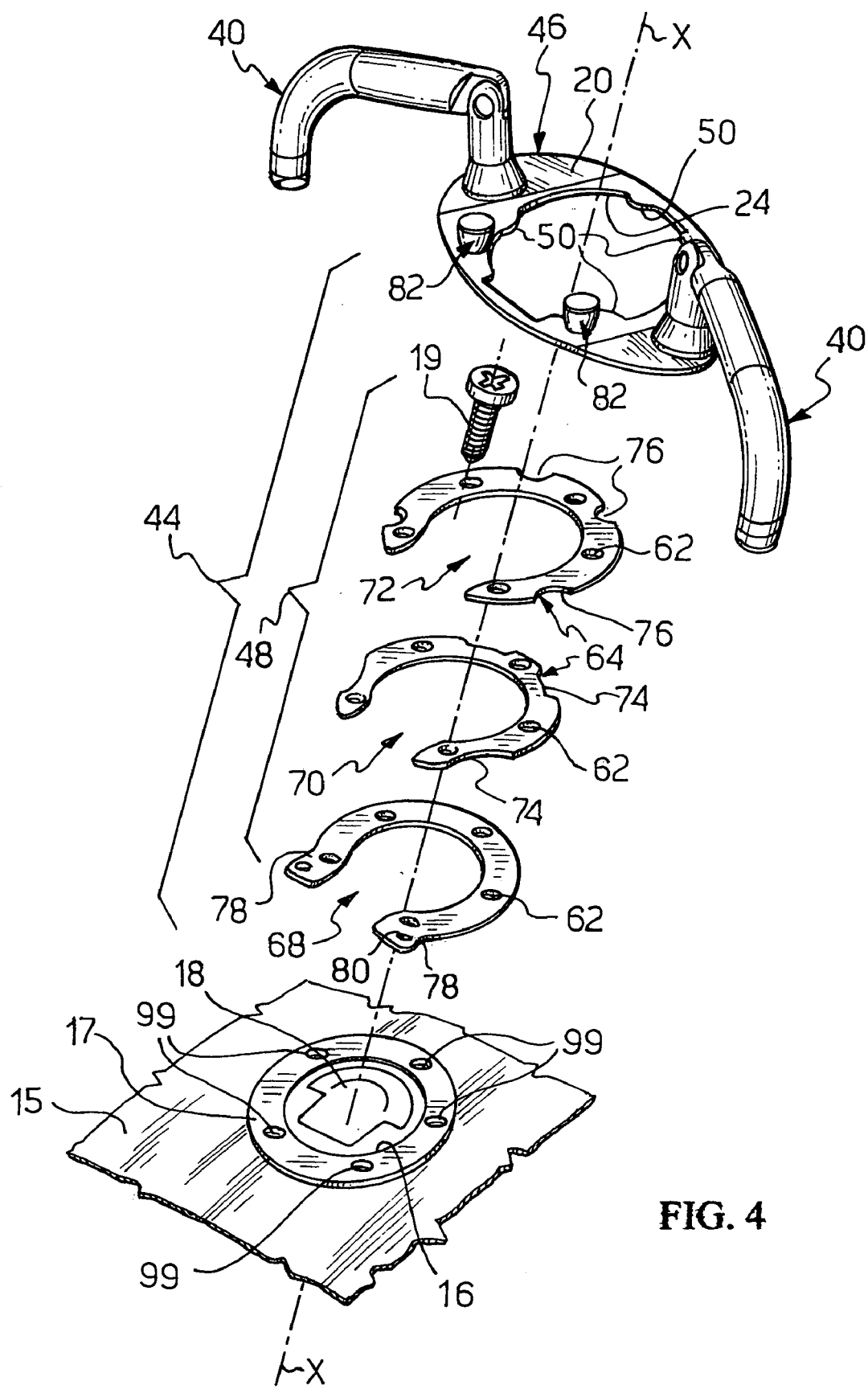
FIG. 4 shows an exploded perspective view of the detail of FIG. 2.

With reference to the figures, a motorcycle according to the present invention is generally indicated with 11.

The motorcycle 11 comprises a frame 12, on which a seat 13 for the driver and for a possible passenger and a fuel tank 15 are mounted.

The tank 15 is equipped with an opening 16 in which there is a bulkhead flange 17 for receiving a cap 18 for closing the tank; associated with said bulkhead flange 17 of the tank 15 there is an accessory like a peg 40 for the passenger and a plurality of screws 19 (in the example of the figures there are five screws) which, passing through housings 99 of said flange 17 and screwing into corresponding threaded seats of the tank 15, fix it firmly to the tank 15.

The peg 40 generally comprises a base 20 and two grips 54 which are fixed onto said base 20 symmetrically spaced apart, one on the right and one on the left, generally cylindrical, ergonomically shaped to make it easy to be gripped by the passenger.

The base 20 is generally flat and plate-shaped, preferably elliptical and shaped in such a way as to substantially adhere to the tank 15 of the motorcycle. The base 20 is also equipped with a substantially circular central through opening 24. Associated with the base 20, according to the example of the figures, there is a pair of cylindrical pins 56, having an axis substantially perpendicular to said base 20. In particular, the cylindrical pins 56 are welded to the base 20.

The grips 54 of the peg 40 have an end 54a associated with a respective cylindrical pin 56 and a free end 54b. The grips 54 are preferably curved in the direction of the tank 15 of the motorcycle near to the free end 54b and are coated with a soft material with a high friction coefficient.

The end 54a is advantageously associated with the respective cylindrical pin 56 by means of a hinge 52 for the positioning of the grip 54 with predetermined angulation.

According to a particularly advantageous aspect of the present invention, the peg 40 is removably associated with said flange 17 through a fixing device 42.

In particular, the fixing device 42 consists of a bayonet joint 44 which is defined between the peg 40 and the bulkhead flange 17.

The bayonet joint 44 preferably comprises a first component 48 equipped with at least one angled slit 64 (in the example of the figures, there are four slits 64) and a second component 46 equipped with at least one projection 50 (in the example of the figures, there are four projections 50) suitable for engaging in said angled slit 64.

Preferably, the first component 48 is associated with said bulkhead flange 17 whereas the second component 46 is associated with the peg 40.

More precisely, the first component 48 preferably comprises a first lower annular element 68 associated with said bulkhead flange 17, a second intermediate annular element 70 equipped with four grooves 74 defining a circumferential portion of the angled slits 64 and a third upper annular element 72 equipped with four recesses 76 defining an axial portion of the angled slits 64. The three annular elements 68, 70 and 72 are sandwiched so as to form a substantially cylindrical crown 58 of an analogous size to that of the bulkhead flange 17 and removably fixed to it by means of the screws 19.

For this purpose, the annular elements 68, 70 and 72 are equipped with holes (five for each element, in the example of the figures) all indicated with 62 and cut in predetermined positions, so as to fit together, when they are applied to the tank 15, with the housings 99 of the bulkhead flange 17. The screws 19, passing through the holes 62 and screwing into their respective housings 99 on the bulkhead flange 17, stably fix the annular elements 68, 70 and 72 (and therefore the first component 48 of said bayonet joint 44) to said bulkhead flange 17.

According to a variant embodiment of the present invention, the substantially cylindrical crown 58 of the first component 48 of the bayonet joint 44 can be realized integrally, through moulding or milling.

In the example of the figures, the second component 46 of the bayonet joint 44 is realized integrally, i.e. it forms a single piece, with said base 20 of the peg 40 and said at least one projection 50 of the second component 46 extends towards the center of the opening 24 of the base 20.

The width of the projections 50 of the second component 46 is slightly less than the width of the corresponding recesses 76 of the third upper element 72, and less than the length of the grooves 74 of the second central element 20.

According to a further aspect of the present invention, the bayonet joint 44 is advantageously equipped with a safety lock 82.

Preferably, the safety lock 82 comprises at least one pin 84, preferably two as indicated in the example of the figures, supported in said second component 46 in a mutually spaced relationship and able to be manually moved in contrast with a spring 90 from a position inserted in a suitable hole 80 defined in said first component 48, at the first lower annular element 68, to a removed position (not represented).

In particular, the first lower annular element 68 has at least one zone 78 protruding the outer circumference of the other intermediate and upper annular elements, 70 and 72 respectively, of the first component 48 of the bayonet joint 44, when such elements are made integral as described above.

Such a zone 78 (in the example of the figures, there are two zones 78) is equipped with the hole 80 for receiving the pin 84 in inserted position of the locking means 82. The pin 84 is supported inside a jacket 91 at an upper end 91a thereof. The spring 90 is, on the other hand, housed between a recess 92 of the jacket 91, at a lower end 91b thereof, and a projection 93 defined at an upper end 94a of a cylindrical pin 94. The cylindrical pin 94 is in turn fixed to the base 20 of the second component 46 at a lower end 94b thereof and is crossed inside of it by the pin 84.

Functionally, according to a preferred embodiment, to fix the peg 40 to the motorcycle 11 it is necessary, as a first step, to unscrew the screws 19 of the bulkhead flange 17 at which one wishes to secure the peg 40.

Then, the three annular elements 68, 70 and 72, respectively lower, central and upper, of the first component 48 of the bayonet joint 44 are rested, in sequence, upon the flange 17, taking care to make the holes 62 fit with the housings 99 of the bulkhead flange 17.

At this point it is necessary to insert the screws 19 in the aforementioned holes 62, screwing them into the respective housings 99 of the bulkhead flange 17, so as to firmly lock the first component 48 of the bayonet joint 44 to the tank 15 of the motorcycle 11.

By doing so, the motorcycle is therefore suitable for receiving the second component 46 of the bayonet joint 44 advantageously associated with an accessory, like a peg 40, for rapid fixing of the accessory to the tank 15.

Indeed, for such a purpose, it is sufficient to orientate the base 20 of the second component 46 equipped with the grips 54, in such a way that the projections 50 are placed over the recesses 76 of the third upper element 72 of the first component 48; to lower the second component 46 along the axial portion of the angled slits 64 until the second intermediate element 70 is reached; and to rotate the second component 46, about the axis X—X of the through opening 24 of the plate 20 which coincides with the axis of the crown 58, in the grooves 74 for the whole circumferential portion of the angled slits 64.

Once the second component 46 of the bayonet joint 44 has been rotated inside the angled slits 64, the fixing of the accessory to the tank 15 of the motorcycle is obtained.

At the same time, during the rotation of the second component 46, the pins 84 of the locking means 82 abut against the upper surface of the first lower annular element 68, in removed position with the jacket 91 that is raised and the spring 90 that is compressed. At the end of the rotation of the second component 46 in the groove 74 of the angled slit 64, the pins 84 are placed at the holes 80 of said first lower annular element 68, with a consequent engagement thereof in the holes 80, by the action of the spring 90, in inserted position.

If one wishes to release the accessory 40 from the tank 15 of the motorcycle it is sufficient to carry out the reverse operations to the fixing described above, taking care initially to raise, by the jackets 91, the pins 84 from the holes 80, so as to unlock the safety lock 82.

It should be noted that the invention also refers to a motorcycle of the type described above characterized in that it comprises, at the bulkhead flange 17, one among a first component 48 equipped with at least one angled slit 64 and a second component 46 equipped with at least one projection 50 suitable for engaging in said at least one angled slit 64 of a bayonet joint 44, said component, 46 or 48, at said bulkhead flange 17, being intended for engagement with the other (48 or 46) of said components associated with an accessory such as the peg 40.

Moreover, the invention also refers to an accessory, such as the peg 40 described above, for a motorcycle of the type comprising a fuel tank 15, an opening 16 situated on said tank 15 for filling up with fuel, a bulkhead flange 17 at said opening 16 for receiving a cap 18 for closing the tank, characterized in that it comprises one among a first component 48 equipped with at least one angled slit 64 and a second component 46 equipped with at least one projection 50 suitable for engaging in said angled slit 64 of a bayonet joint 44, said component, 46 or 48, of said accessory 40 being intended for engagement with the other (48 or 46) of said components associated with said bulkhead flange 17 of the tank 15 of the motorcycle.

The main advantage resulting from the present invention consists of uncommon structural simplicity in the fixing of the accessory to the tank of the motorcycle.

A further advantage lies in the high strength of the bayonet joint fixing provided between the accessory and the tank of the motorcycle, which ensures a long lifetime, practically without the need for periodical maintenance. Moreover, it is resistant to atmospheric agents.

Yet another advantage is given by the practicality of use, for the speed of fixing of the accessory on the tank of the motorcycle and for the speed of removal, operations which can be carried out by the users of the motorcycle themselves.

It should be noted how the present invention lends itself to being realized in a particularly advantageous manner also in relation to existing motorcycles. Indeed, the assembly of one of the two components of the bayonet joint on the tank can be carried out not only in the factory but even by motorcycle maintenance machine shops, as well as by the user himself.

Furthermore, such fixing is removable and adaptable to a wide range of motorcycle models, and therefore is applicable onto most motorcycles in circulation.

Thanks to the presence of a safety lock, and in particular to the presence of spaced apart pins, the present invention allows the accessory to be fixed to and unhooked from the tank of the motorcycle in an extremely controlled and safe manner, in particular for accessories such as pegs for a passenger where the maximum stability and safety of use are required.

Moreover, the peg described above, associated with the tank of the motorcycle and comprising one of the two components of the bayonet joint, is ergonomic, adjustable thanks to the presence of a hinge between the grip and the base, and has an arrangement compatible with the bulk of the occupants and does not disturb the driver during driving.

Said peg is also aesthetically pleasing, being morphologically shaped like the grip of the driver's handlebars.

The finding thus described is susceptible to variants and modifications aimed at satisfying contingent and specific requirements, moreover all covered by the scope of protection of the finding itself, as defined by the following claims.

The invention claimed is:

1. A motorcycle comprising:
   a fuel tank;
   an opening situated on said tank for filling up with fuel;
   a bulkhead flange at said opening for receiving a cap for closing the tank and an accessory associated with said tank; and
   a bayonet joint between said accessory and said bulkhead flange, for the rapid fixing of the accessory to the tank.

2. The motorcycle according to claim 1, wherein said bayonet joint comprises a first component equipped with at least one angled slit and a second component equipped with at least one projection suitable for engaging in said angled slit, said first component being associated with said bulkhead flange and said second component being associated with said accessory.

3. The motorcycle according to claim 2, wherein said first component comprises a first lower annular clement associated with said bulkhead flange a second intermediate annular element equipped with at least one groove defining a circumferential portion of said angled slit and a third upper annular element equipped with at least one recess defining an axial portion of said angled slit, said three annular elements being sandwiched and removably fixed to said bulkhead flange by means of suitable screws.

4. The motorcycle according to claim 1, wherein said accessory is a peg for the a passenger comprising a base and two symmetrical grips one right and one left, said base being in a single piece with said a second component of the bayonet joint.

5. The motorcycle according to claim 4, wherein said accessory comprises, for each grip a hinge between the grip and the base for the positioning of the grip with predetermined angulation.

6. The motorcycle according to claim 2, wherein said bayonet joint is equipped with a safety lock.

7. The motorcycle according to claim 6, wherein said safety lock comprises at least one pin supported in said second component and able to be manually moved in contrast with a spring from a position inserted in a suitable hole defined in said first component to a removed position.

8. The motorcycle according to claim 7, wherein the pins are two in number, spaced apart in said second component.

9. A motorcycle comprising:
   a fuel tank;
   an opening situated on said tank for filling up with fuel;
   a bulkhead flange at said opening for receiving a cap for closing the tank, and
   at said bulkhead flange at least one first component equipped with at least one angled slit and a second component equipped with at least one projection suitable for engaging in said angled slit of a bayonet joint said component at said bulkhead flange being intended for engagement with the other of said components associated with an accessory.

10. An accessory for a motorcycle comprising a fuel tank, an opening situated on said tank for filling up with fuel, a bulkhead flange at said opening for receiving a cap for closing the tank, the accessory comprising:
   at least one first component equipped with at least one angled slit and a second component equipped with at least one projection suitable for engaging in said angled slit of a bayonet joint said component of said accessory being intended for engagement with the other of said components associated with said bulkhead flange of the tank of the motorcycle.

* * * * *